Patented Mar. 12, 1929.

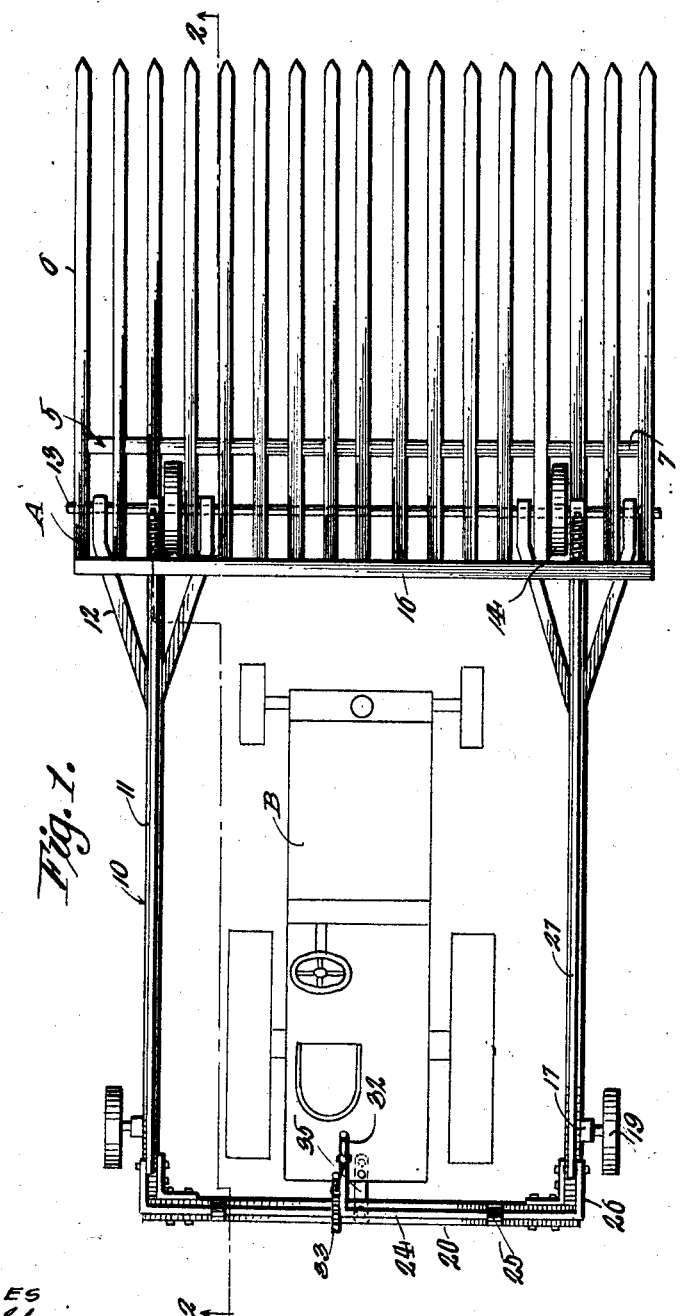

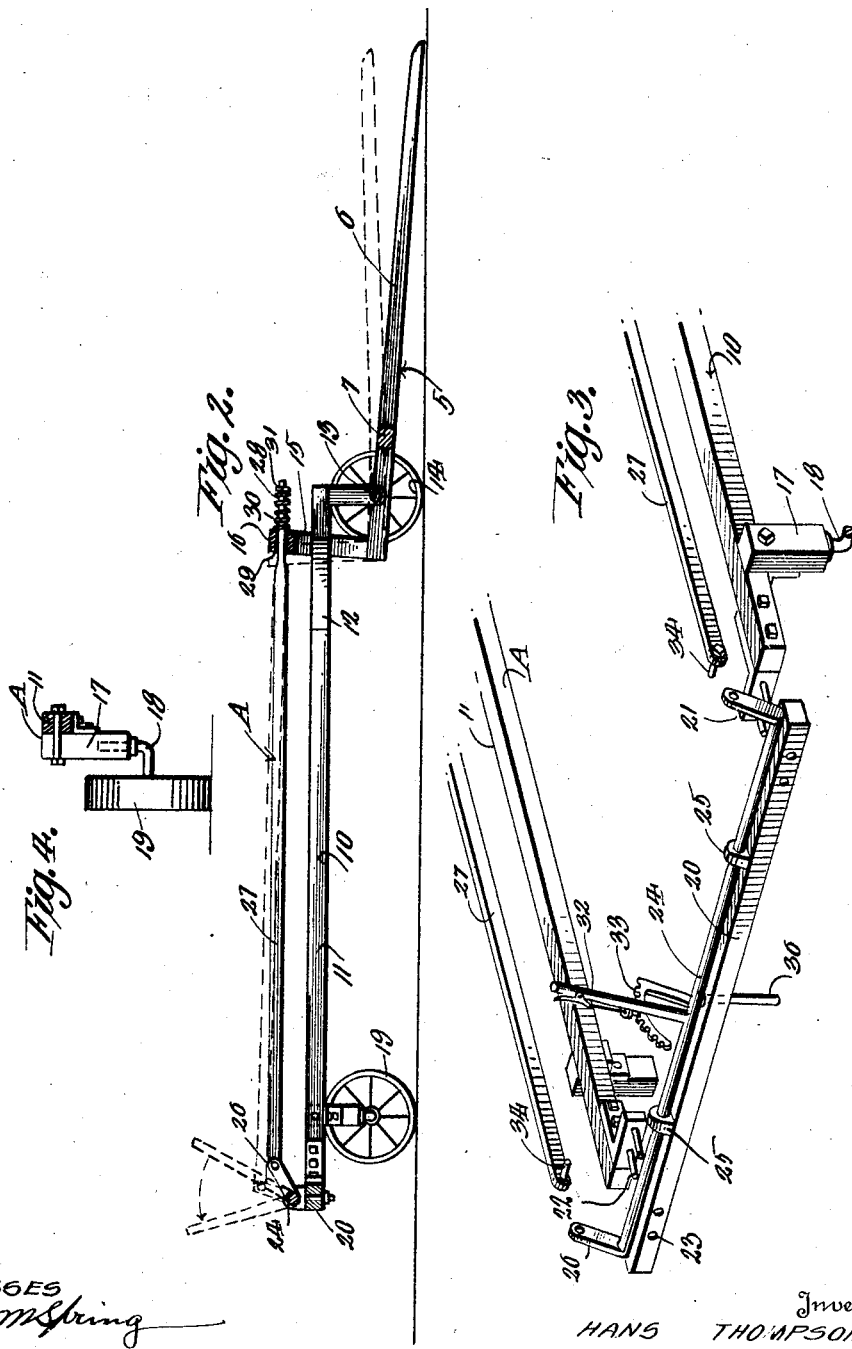

1,705,318

UNITED STATES PATENT OFFICE.

HANS THOMPSON, OF GRIDLEY, CALIFORNIA, ASSIGNOR OF ONE-FOURTH TO R. H. DENNIS AND ONE-FOURTH TO JAMES J. BRADY, BOTH OF GRIDLEY, CALIFORNIA.

TRACTOR HITCH FOR HAY BUCKS.

Application filed August 17, 1926. Serial No. 129,815.

This invention appertains to hay rakes or gatherers and the primary object of the present invention is to provide novel means for connecting a hay rake or gatherer with a conventional tractor, whereby the hay can be readily gathered under power.

Another important object is the provision of a hay rake provided with a rectangular frame in which a standard type of tractor may be hitched, so that the driver of the tractor may propel the rake to any part of a hay field and harvest the hay.

A further object of the invention is the provision of a rectangular frame attachment carried by the rake for receiving the tractor, and novel means for removably associating the rear bar of the frame therewith, so that the tractor can be driven into and out of the frame without any difficulty on the part of the operator.

A further object of the invention is the provision of means for raising and lowering the rake or buck on the frame, from the driver's seat of the tractor, whereby the entire device can be controlled by a single person.

A further object of the invention is the provision of means for connecting the rear wheels to the frame, so that the wheels can track in any direction, to facilitate the steering of the rake when the tractor starts to make a turn.

A still further object of the invention is to provide an improved hay rake attachment for tractors of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a top plan view of the improved device showing the same connected with a conventional tractor, Figure 2 is a longitudinal section through the device taken on the line 2—2 of Figure 1 looking in the direction of the arrows, Figure 3 is a perspective view of the rear end of the frame of the rake, showing the means for detachably connecting the rear bar in place, whereby the tractor may be driven into and out of the frame, and Figure 4 is a detail section illustrating the means of connecting one of the rear wheels to the frame.

Referring to the drawings in detail, wherein similar reference characters designate corresponding parts throughout the several views, the letter A generally indicates the improved hay rake and B a tractor for pulling the rake about a field.

The tractor is of any conventional type well known to the trade and will not be described in detail.

The rake A comprises a usual buck 5 having a plurality of forwardly extending rake teeth 6, which are connected together by a transverse block 7. The hay rake buck 5 is supported on a novel rectangular frame 10 at the front thereof and this frame forms one of the novel features of the invention.

The frame 10 embodies spaced parallel longitudinally extending side bars 11, which can be formed of any desired material such as suitable timbers. The forward terminals of the side bars 11 are provided with fork shaped extensions 12 which receive the transversely extending shaft 13. This shaft 13 also extends through the tines or teeth 6 of the hay buck 5, so as to permit the buck to rock thereon. Suitable ground wheels 14 are rotatably mounted upon the shaft and serve as means for spacing the front of the frame 10 a predetermined distance from the ground. The side tines 6 have connected to their rear ends short upright standards 15, the upper ends of which are connected to a cross brace 16 for a purpose, which will be hereinafter more fully described. It is to be noted that the standards 15 will extend at right angles to the tines.

Adjacent to the rear ends of the side bars 11 are depending supporting blocks 17 which are provided with inwardly directed bores at their lower ends for the reception of L-shaped stub axles 18, which axles rotatably support the rear ground wheels 19. These axles are mounted to freely rotate in the blocks 17, so as to allow the free steering of the frame.

A rear bar 20 is provided for the frame and is removably connected with the side bars 11, so as to permit the entrance and exit of the tractor into and out of the frame. The side bars 11, the rear bar 20 and the bar 16 of the buck define a substantially rectangular frame for entirely enclosing the tractor as clearly shown in Figure 1 of the drawings. In order to permit the free removing of the rear bar 20 of the frame, the side bars 11 have secured to their inner faces angle brackets 21, which brackets carry suitable bolts 22 which are adapted to extend through openings 23 formed in the rear bar. Suitable nuts or cotter pins can be connected by the bolts 22 for holding the rear bar in place.

In order to permit the raising of the buck after a load has been received thereon, a rock shaft 24 is rotatably mounted in bearings 25 carried by the upper face of the bar 20 and the terminals of this rock shaft 25 are provided with cranks 26. The cranks 26 are adapted to be detachably connected with forwardly extending links 27 and these links have their forward ends reduced as at 28 and positioned through suitable openings 29 formed in the bar 15. Coiled springs 30 are placed about the reduced portions 28 of the links and are confined between the bar 16 and nuts 31 threaded on the reduced portion of said links. Secured to or formed on the rock shaft 24 is a manipulating crank 32 and it is obvious that by manipulating the crank, the shaft can be rocked for drawing the links 27 rearwardly, which in turn will rock the buck rake on the shaft 13 causing the raising of the forward ends of the tines. This will permit the lifting of the load and prevent the load from falling off of the same. The springs 30 act to absorb the shock at the start of the raising of the load and when the rake is released.

If preferred a suitable quadrant and dog 33 can be provided for holding the lever 32 in an adjusted position.

Attention is also invited to the fact that suitable removable bolts 34 are utilized for connecting the rear ends of the links 27 with the cranks 26, whereby these links can be quickly detached from the cranks when the rear bar 20 is being removed from the frame.

In operation of the improved device, when it is desired to gather hay, the rear bar 20 is removed and the tractor B is driven into the frame 10. A draw bar 35 is connected to the rear end of the tractor and a suitable pin 36 carried by the bar 20 at the transverse center thereof. The bar 20 is now secured in place on the frame and the entire device is now driven across a field to pick up the hay. After a load has been gathered upon the buck the lever 32 is manipulated so as to raise the buck and permit carrying of the load. After the hay has been gathered, it is merely necessary to release the pin 36 from the draw bar 35 and remove the bar 20 from the side bars 11 and allow the tractor to be driven from out of the frame. It is to be noted that the lever 32 is arranged in close proximity to the driver's seat of the tractor, whereby a single operator can drive the tractor and actuate the hay gatherer.

Changes in details may be made without departing from the spirit or the scope of this invention, but what I claim as new is:

1. In a hay gatherer, the combination with an open frame including a pair of side bars, a rear bar, means connecting the rear bar with the side bars, and a buck carried by the front of the frame, of a tractor movable into and out of the frame in back of the toothed buck when the rear bar is removed from the side bars, and means including a draw bar carried by the tractor and a pin carried by the rear bar for detachably connecting the tractor with the frame.

2. In a hay gatherer, the combination with an open frame including a pair of spaced longitudinally extending side bars, and a detachable rear bar connected with the side bar, and a buck rockably carried by the front of the frame having a cross bar arranged above and in rear of the pivot point thereof, of a tractor movable into and out of the frame when the rear bar is disconnected from the side bars, means connecting the tractor with the rear bar, a rock shaft carried by the rear bar, means detachably connecting the rock shaft with the cross bar, and means for rocking the shaft from the driver's seat on the tractor.

3. In a hay gatherer, the combination with an open tractor receiving frame including side bars and a rear bar, of a toothed hay buck rockably mounted on the front of the frame having a cross bar arranged above and in rear of the pivot point of the toothed buck, ground wheels for supporting the front and rear of the frame, a rock shaft carried by the rear bar, cranks on said rock shaft, forwardy extending links detachably and pivotally connected cranks, means slidably connecting the forward terminals of the links to the cross bar, and coil springs arranged upon said links and disposed between the cross bar and adjustment members on the links.

4. In a hay gatherer, the combination with a wheeled frame, having a removable bar constituting a gate, a rake connected to the forward end of the frame, of a tractor movable into and out of the frame through the gateway and means detachably connecting the tractor with the frame.

5. In a hay gatherer, the combination with an open rectangular wheels frame having a removable bar constituting a gate, and a toothed buck connected with the forward end of the frame, of a tractor movable into and out of the frame in the rear of the buck, through the gateway, and means detachably connecting the rear end of the tractor with the frame.

In testimony whereof I affix my signature.

HANS THOMPSON.